(12) United States Patent
Saros (10) Patent No.: US 9,047,501 B2
(45) Date of Patent: Jun. 2, 2015

(54) METHOD, APPARATUS, AND COMPUTER PROGRAM PRODUCT FOR DETECTING RISK TAGS

(75) Inventor: Jakob Saros, Solna (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 398 days.

(21) Appl. No.: 13/321,652

(22) PCT Filed: May 29, 2009

(86) PCT No.: PCT/SE2009/050624
§ 371 (c)(1),
(2), (4) Date: Nov. 21, 2011

(87) PCT Pub. No.: WO2010/138038
PCT Pub. Date: Dec. 2, 2010

(65) Prior Publication Data
US 2012/0068828 A1 Mar. 22, 2012

(51) Int. Cl.
*H04Q 5/22* (2006.01)
*G06K 7/00* (2006.01)
(Continued)

(52) U.S. Cl.
CPC ............ *G06K 7/0008* (2013.01); *G06K 7/0095* (2013.01); *G06K 7/10465* (2013.01); *G06Q 10/08* (2013.01)

(58) Field of Classification Search
CPC ....... G06K 7/00; G06K 7/10; G06K 7/10009; G06K 7/10118; G06K 7/10128; G06K 19/00; G06K 19/06; G06K 19/067; G06K 19/07; G06K 2017/0051; G06K 7/0095; G06K 7/01; G06K 7/0008; G06Q 10/08; G06Q 10/087; G06Q 20/203

USPC .......................... 340/10.1–10.6, 572.1–572.9; 702/57–59, 81–84
See application file for complete search history.

(56) References Cited

U.S. PATENT DOCUMENTS 5,543,780 A * 8/1996 McAuley et al. .......... 340/572.1
5,912,622 A * 6/1999 Endo et al. ................. 340/572.5
(Continued)

FOREIGN PATENT DOCUMENTS

JP 2007033259 A 2/2007
WO 2006094030 A2 9/2006

OTHER PUBLICATIONS

Isomursu, "Tags and the City," PsychNology Journal, 2008, vol. 6, No. 2, pp. 131-156.
(Continued)

*Primary Examiner* — Steven Lim
*Assistant Examiner* — Ryan Sherwin
(74) *Attorney, Agent, or Firm* — Rothwell, Figg, Ernst & Manbeck, P.C.

(57) ABSTRACT

It is presented a risk tag detector server for detecting risk tags, the risk tags being tags which are likely to be faulty. The risk tag detector server comprises: a tag manager interface configured to obtain a tag list comprising at least two tags to evaluate, and to obtain tag data coupled to each of the tags of the tag list; a tag selector configured to select a candidate tag to evaluate from the tag list; a tag event interface configured to obtain event data of tag usage for the candidate tag; and a fault detector configured to determine the candidate tag to be a risk tag when a first condition is satisfied, the first risk condition comprising a first criterion that the event data indicates an absence of candidate tag usage during a predetermined time period. A corresponding method and computer program are also presented.

11 Claims, 6 Drawing Sheets

(51) Int. Cl.
*G06K 7/10* (2006.01)
*G06Q 10/08* (2012.01)

(56) References Cited

U.S. PATENT DOCUMENTS

| | | | | |
|---|---|---|---|---|
| 5,963,134 | A * | 10/1999 | Bowers et al. | 340/572.1 |
| 6,043,746 | A * | 3/2000 | Sorrells | 340/572.7 |
| 6,058,374 | A * | 5/2000 | Guthrie et al. | 705/28 |
| 6,195,006 | B1 | 2/2001 | Bowers et al. | |
| 6,232,877 | B1 * | 5/2001 | Ashwin | 340/572.1 |
| 7,199,715 | B2 * | 4/2007 | Fields et al. | 340/572.1 |
| 7,295,114 | B1 * | 11/2007 | Drzaic et al. | 340/572.1 |
| 7,295,117 | B2 * | 11/2007 | Forster et al. | 340/572.1 |
| 7,394,358 | B2 * | 7/2008 | Cherry | 340/505 |
| 7,466,232 | B2 * | 12/2008 | Neuwirth | 340/572.1 |
| 7,576,650 | B1 * | 8/2009 | Ghaffari | 340/572.1 |
| 8,471,682 | B1 * | 6/2013 | Gilboy | 340/10.4 |
| 2006/0049250 | A1 | 3/2006 | Sullivan | |
| 2006/0094412 | A1 * | 5/2006 | Nonoyama et al. | 455/418 |
| 2007/0150382 | A1 * | 6/2007 | Danilewitz | 705/28 |
| 2008/0155258 | A1 | 6/2008 | Obereiner et al. | |
| 2008/0174407 | A1 | 7/2008 | Chen et al. | |
| 2008/0278294 | A1 | 11/2008 | Konuma | |
| 2009/0011772 | A1 * | 1/2009 | Choi et al. | 455/456.1 |
| 2009/0203367 | A1 * | 8/2009 | Pamminger et al. | 455/414.3 |
| 2010/0060452 | A1 * | 3/2010 | Schuster et al. | 340/572.1 |
| 2010/0156628 | A1 * | 6/2010 | Ainsbury et al. | 340/540 |

OTHER PUBLICATIONS

Supplementary European Search Report issued on Mar. 27, 2014 in corresponding European application No. EP 09845311, 7 pages.
Office Action issued on Jul. 22, 2013 in corresponding Japanese application No. 2012-513002, 4 pages.

* cited by examiner

METHOD, APPARATUS, AND COMPUTER PROGRAM PRODUCT FOR DETECTING RISK TAGS

CROSS REFERENCE TO RELATED APPLICATION(S)

This application is a 35 U.S.C. §371 National Phase Entry Application from PCT/SE2009/050624, filed May 29, 2009, designating the United States, the disclosure of which are incorporated herein in its entirety by reference.

TECHNICAL FIELD

The invention relates generally to tag management, and more particularly to detecting risk tags which are likely to be faulty.

BACKGROUND

Near Field Communication (NFC) technology is predicted to be included in mass-market mobile devices in the coming years and will enable new application services like payment and ticketing in mobile devices. NFC uses short-range RFID technologies, typically at 13.56 MHz, and contactless card technologies such as Mifare.

One example of how NFC can be used is to allow users to read a tag with a mobile terminal, whereby the mobile terminal retrieves content associated with the tag. Alternatively, interaction with a server from the mobile terminal can be triggered by a simple tag reading.

The tags are hence deployed in various locations, and can typically also be deployed outdoors, where tags could get vandalised. Wear and tear can also cause tags to malfunction.

There are no satisfactory solutions for discovering that a tag is malfunctioning or has been vandalised other than physically verifying the functionality of each tag.

Consequently, there is a pressing need for an efficient solution on how to monitor tags.

SUMMARY

An object of the invention is to alleviate the problem of tag monitoring by providing a solution for detecting risk tags which are likely to be faulty.

According to a first aspect of the invention, it is presented a risk tag detector server for detecting risk tags, the risk tags being tags which are likely to be faulty. The risk tag detector server comprises: a tag manager interface configured to obtain a tag list comprising at least two tags to evaluate, and to obtain tag data coupled to each of the tags of the tag list; a tag selector configured to select a candidate tag to evaluate from the tag list; a tag event interface configured to obtain event data of tag usage for the candidate tag; and a fault detector configured to determine the candidate tag to be a risk tag when a first condition is satisfied, the first risk condition comprising a first criterion that the event data indicates an absence of candidate tag usage during a predetermined time period.

This allows operational personnel to prioritise any monitoring of the tags. For example, the operational personnel can decide to visit all risk tags and use a mobile terminal or other equipment to determine whether the tag is present and operational or not. Using this risk determination, the workload of the operational personnel is greatly reduced and allows the tag owner to efficiently monitor the tags and remedy any problems.

The fault detector may also be configured to determine the candidate tag to be a risk tag when a second condition is satisfied, the second risk condition comprising a first criterion that the event data indicates that the tag has been removed from an installation location.

The risk tag detector server may be configured to repeat the selecting, obtaining event data and determining until all tags of the tag list have been selected by the tag selector.

The fault detector may be configured to: when the event data indicates an absence of candidate tag usage during a predetermined time period, obtain event data for any nearby tags, being tags near the candidate tag; and the first risk condition may further comprise a second criterion that there is at least one nearby tag, and an establishment, using the event data of the candidate tag and the at least one nearby tag, of whether the candidate tag is a risk tag.

The risk tag detector server may further be configured to obtain historical usage data of each of the tags of the tag list; and the establishment may comprise evaluating the historical usage data to obtain a probability that the candidate tag should have been detected in the predetermined time period.

The fault detector may be configured to indicate that the tag has been removed from an installation location when the event data comprises repetitive tag detections of the candidate tag by a single mobile terminal.

The tag manager interface may be configured to obtain an installation location for each of the tags of the tag list; and the tag event interface may be configured to obtain a detection location, and the fault detector may be configured to indicate that the tag has been removed from an installation location when the detection location substantially differs from the installation location of the candidate tag.

The fault detector may be configured to, when it is determined that the candidate tag is risk tag, assign a severity level to the candidate tag depending on what criteria is satisfied.

A second aspect of the invention is a method for detecting risk tags, the risk tags being tags which are likely to be faulty. The method comprises the steps, performed in a risk tag detector server, of: obtaining a tag list comprising at least two tags to evaluate; obtaining tag data coupled to each of the tags of the tag list; selecting a candidate tag to evaluate from the tag list; obtaining event data of tag usage for the candidate tag; and determining the candidate tag to be a risk tag when a first condition is satisfied, the first risk condition comprising a first criterion that the event data indicates an absence of candidate tag usage during a predetermined time period.

The steps of selecting, obtaining event data and determining may be repeated until all tags of the tag list have been selected in the selecting step.

The step of determining may comprise: when the event data indicates an absence of candidate tag usage during a predetermined time period, obtaining event data for any nearby tags, being tags near the candidate tag; and the first risk condition may further comprise a second criterion that there is at least one nearby tag, and an establishment, using the event data of the candidate tag and the at least one nearby tag, of whether the candidate tag is a risk tag.

The method may further comprise obtaining historical usage data of each of the tags of the tag list; and the establishment may comprise evaluating the historical usage data to obtain a probability that the candidate tag should have been detected in the predetermined time period.

The step of determining may comprise: determining the candidate tag to be a risk tag when a second condition is satisfied, the second risk condition comprising a third criterion that the event data indicates that the tag is has been removed from an installation location.

It may be indicated that the tag has been removed from an installation location when the event data comprises repetitive tag detections of the candidate tag by a single mobile terminal.

The step of obtaining tag data may comprise obtaining an installation location for each of the tags of the tag list; and the step of obtaining event data may comprise obtaining a detection location, and it may be indicated that the tag has been removed from an installation location when the detection location substantially differs from the installation location of the candidate tag.

When it is determined that the candidate tag is risk tag, a severity level may be assigned to the candidate tag depending on what criterion is satisfied.

A third aspect of the invention is a computer program for a risk tag detector server. The computer program may comprise computer program code which, when run on the risk tag detector server causes the risk tag detector server (1) to perform the steps of: obtaining a tag list comprising at least two tags to evaluate; obtaining tag data coupled to each of the tags of the tag list; selecting a candidate tag to evaluate from the tag list; obtaining event data of tag usage for the candidate tag; and determining the candidate tag to be a risk tag when a first condition is satisfied, the first risk condition comprising a first criterion that the event data indicates an absence of candidate tag usage during a predetermined time period.

The steps of selecting, obtaining event data and determining may be repeated until all tags of the tag list have been selected in the selecting step.

The step of determining may comprise: when the event data indicates an absence of candidate tag usage during a predetermined time period, obtaining event data for any nearby tags, being tags near the candidate tag; and the first risk condition may further comprise a second criterion that there is at least one nearby tag, and an establishment, using the event data of the at least one nearby tag, of whether the candidate tag is a risk tag.

The computer program may cause the risk tag detector server to obtaining historical usage data of each of the tags of the tag list; and the establishment may comprise evaluating the historical usage data to obtain a probability that the candidate tag should have been detected in the predetermined time period.

The step of determining may comprise: determining the candidate tag to be a risk tag when a second condition is satisfied, the second risk condition comprising a third criterion that the event data indicates that the tag is has been removed from an installation location.

It may be indicated that the tag has been removed from an installation location when the event data comprises repetitive tag detections of the candidate tag by a single mobile terminal.

The step of obtaining tag data may comprise obtaining an installation location for each of the tags of the tag list; and the step of obtaining event data may comprise obtaining a detection location, and it may be indicated that the tag has been removed from an installation location when the detection location substantially differs from the installation location of the candidate tag.

When it is determined that the candidate tag is risk tag, a severity level may be assigned to the candidate tag depending on what criterion is satisfied.

A fourth aspect of the invention is a computer program product comprising a computer program according to the third aspect and a computer readable means on which the computer program is stored.

It is to be noted that, when applicable, any aspects of the first, second, third and fourth aspects can be applied to any other aspect.

The word 'plurality' in the description and claims is to be interpreted as meaning 'more than one'.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
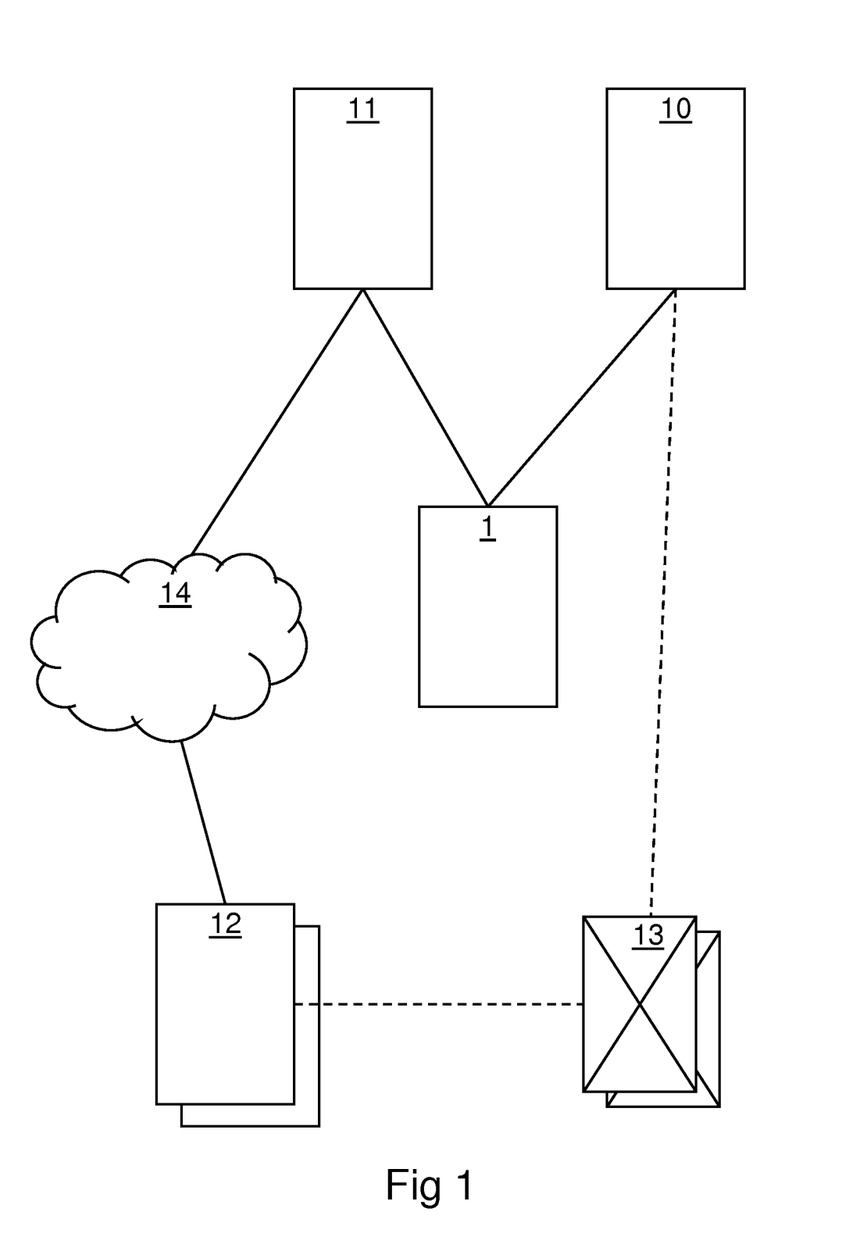
FIG. 1 is a schematic diagrams illustrating an environment where an embodiment of the present invention can be deployed.

FIG. 1 is a schematic diagrams illustrating an environment where an embodiment of the invention can be deployed. Mobile terminals 12 read one or more tags 13, but typically one tag at a time. The mobile terminals 12 connect over a network 14 to an event collector server 11 to report tag readings.

The mobile terminals 12 can be of any suitable portable equipment which is capable of reading tags 13, e.g. mobile phones, PDAs (personal digital assistants), netbook computers, etc. The reading of the tags 13 can be performed using radio transmission, optical reading, inductive coupling, etc., for instance in the form of near field communication, Bluetooth, one dimensional barcode reading such as EAN (European Article Number), two dimensional barcode reading such as QR (Quick Response) code or Datamatrix, or any combination of the above. Each tag has a tag ID, which is at least locally unique (within the network), or even globally unique.

The network 14 is any suitable digital network connecting the mobile terminals 12 and the event collector server 11. For instance, the network can be a wide area network such as the Internet, a wireless telecommunications network such as LTE (Long Term Evolution), UMTS (Universal Mobile Telecommunications System), GPRS (General Packet Radio Service), FOMA (Freedom Of Mobile Multimedia Access), E-UTRAN (Evolved UMTS Terrestrial Radio Access Network), CDMA2000 (Code Division Multiple Access 2000), or any combination of these networks.

The event collector server 11 logs event data about the reading, such as tag ID, time, user of the mobile terminal 12 and/or identifier of the mobile terminal 12, such as MSISDN (Mobile Subscriber Integrated Services Digital Network) number and IMSI (International Mobile Subscriber Identity). Optionally, the event data includes data about the location where the reading occurred. The location data can for example be GPS (global positioning system) data from the mobile terminal 12, triangulation data or cell id from the mobile network that the mobile terminal is connected to, as relayed by the mobile terminal 12. The event collector server 11 comprises, internally or externally or even remotely, a memory, for a database, for storing the event data.

A tag manager server 10 contains tag data about each tag. The tag data can for example comprise the physical location (e.g. in global location co-ordinates which can be generated from a GPS receiver) of a tag, grouping of the tag or the deployment status of a tag. Deployment statuses can for instance be that the tag is not deployed yet, that it is deployed and active, that it is deployed and intentionally disabled, that it is deployed and confirmed to be malfunctioning or that it has been removed from the installation location. The tag grouping can for example be data about where the tag is deployed, e.g. at a particular sports arena, or zone 123 of the public transport network of Stockholm. The tag manager server 10 comprises, internally or externally or even remotely, a memory for storing the tag data, such as a database.

A risk tag detector server 1 processes data from the event collector server 11 and the tag manager server 10 to determine tags that are risk tags, i.e. tags that are likely to be faulty. This determination will be explained in more detail below. A tag can be considered to be faulty when it is not operable to users. For example, the tag is faulty if it is malfunctioning. This can be due to an internal fault in the tag or due to wear and tear. The tag can also malfunction due to vandalism. Moreover, if the tag is removed, it can be considered to be faulty, even if is not malfunctioning, since the tag can not be used as intended if it is not in the location it was intended to be. For example, someone can have stolen the tag, whereby it is then considered faulty.

Figure 2:
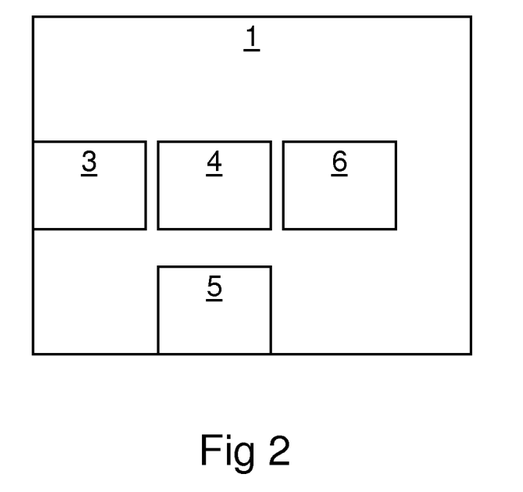
FIG. 2 is a schematic diagram illustrating internal modules of the risk tag detector server of FIG. 1.

FIG. 2 shows the following modules: a tag manager interface 3, a tag selector 4, a tag event interface 5 and a fault detector 6 of the risk tag detector server 1 of FIG. 1. The various modules can be implemented by means of software and/or hardware. It is also to be noted that the modules may share some hardware components such as controllers and memory.

The tag manager interface 3 interfaces with the tag manager server 10 to obtain a tag list. Furthermore, the tag manager interface 3 obtains tag data coupled to each of the tags of the tag list.

The tag selector 4 selects, from the tag list, a candidate tag to evaluate. This selection will be explained in more detail below with reference to the flow chart in FIG. 4.

The tag event interface 5 obtains event data of tag usage for the candidate tag from the event collector server 11.

The fault detector 6 then does the actual determination of whether the candidate tag is a risk tag. The details of this determination is explained in more detail below in conjunction with FIGS. 5a-b.

Figure 3:
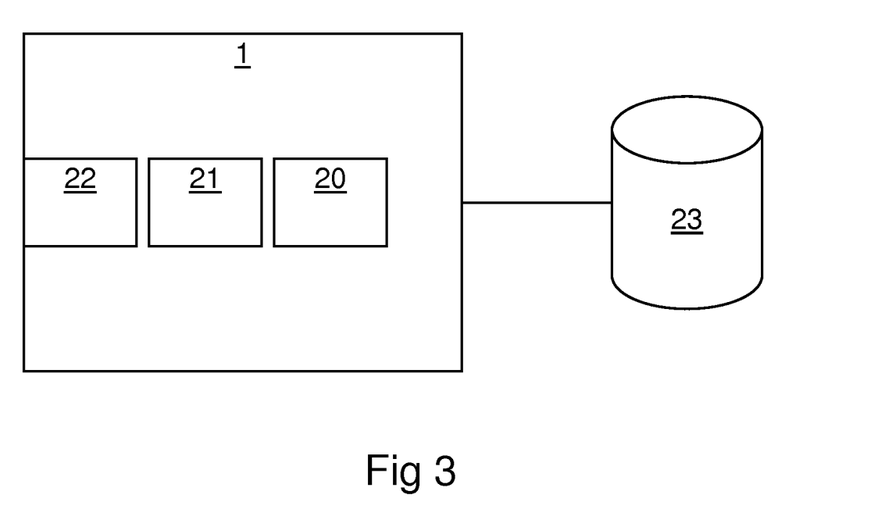
FIG. 3 is a schematic diagram illustrating components of the risk tag detector server of FIG. 1.

FIG. 3 is a schematic diagram illustrating components of the risk tag detector server 1 of FIG. 1 from more of a hardware perspective. A controller 21 is provided using any suitable central processing unit (CPU), microcontroller, digital signal processor (DSP), etc., capable of executing software instructions stored in a computer program product in the form of a memory 20. The memory 20 can be any combination of read and write memory (RAM) and read only memory (ROM). The risk tag detector server 1 also comprises persistent storage 23, e.g. for storing the list of risk tags. The persistent memory 23 can be any single one or combination of magnetic memory, optical memory, or solid state memory. The persistent storage 23 can be dedicated storage for the risk tag detector server 1, or it can be shared storage for the risk tag detector server 1, and other entities, such as the event collector server 11 and/or the tag manager server 10. A network interface 22 allows the risk tag detector server 1 to communicate with other entities, such as the event collector server 11 and the tag manager server 10.

Optionally, a user interface is provided (not shown) for operator usage. Alternatively or additionally, the risk tag detector server 1 can be operated remotely or locally using the network interface 22.

The risk tag detector server 1 can be integrated in one unit, or it can be separated into several separate units, e.g. for reasons of upgradeability, ease of implementation or redundancy. In the case that there are several units that make up the risk tag detector server 1, some units may be present in more than one unit, such as the controller 21 and the memory 20.

Figure 4:
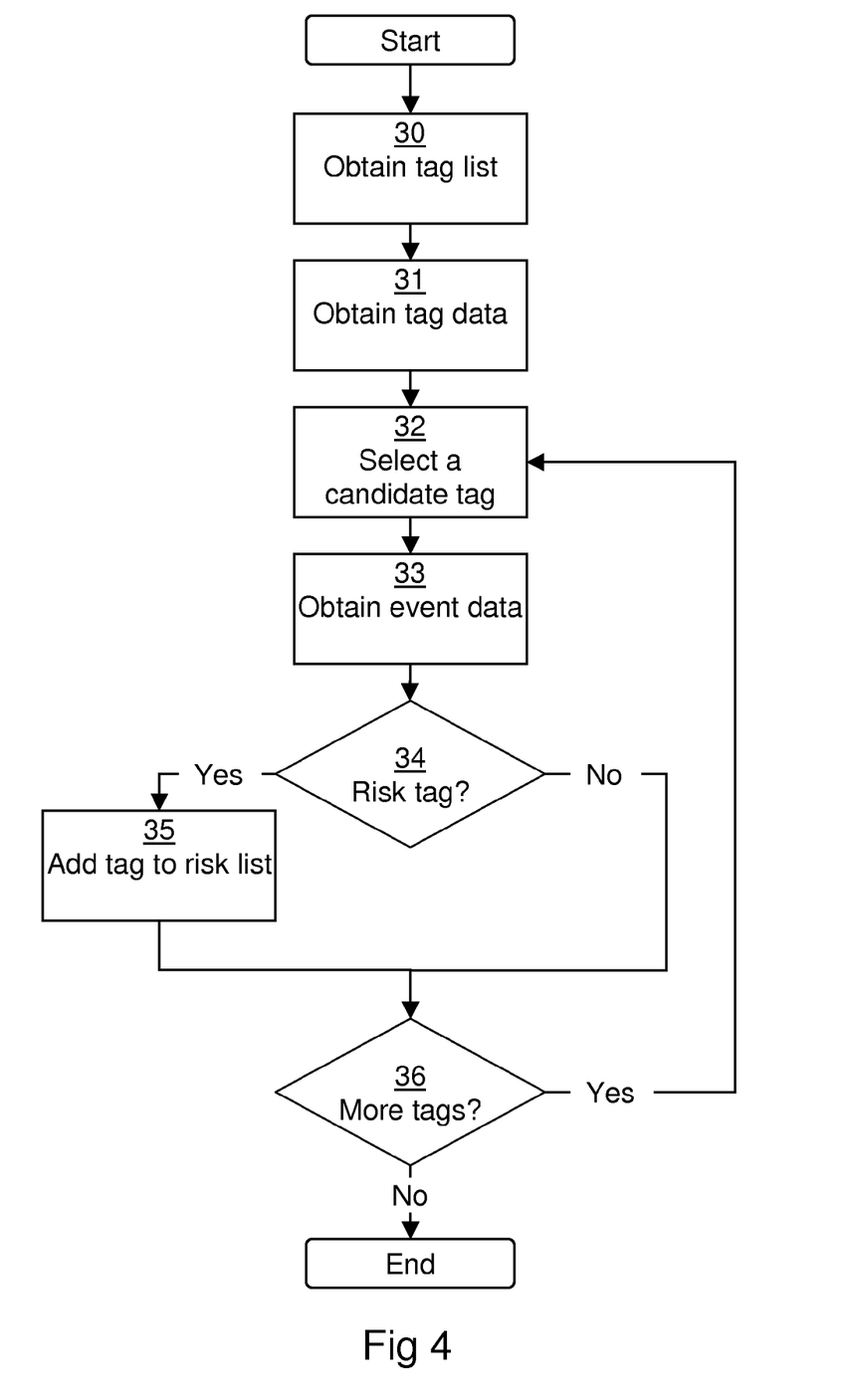
FIG. 4 is a flow chart illustrating a method performed in the risk tag detector server of FIG. 1, FIGS. 5a-b are flow charts illustrating the risk tag determination in more detail.

FIG. 4 is a flow chart illustrating a method performed in the risk tag detector server of FIG. 1. The method is typically performed as a batch process at regular intervals, e.g. daily, weekly or monthly. Any other interval length including dynamic or ad hoc interval lengths are equally possible.

In an initial obtain tag list step 30, a tag list of tags to evaluate is obtained using the tag manager server 10. The list can for example include all tags of the tag manager server 10, all tags of a specific grouping (e.g. a specific area) or all tags associated with a particular use, e.g. public transport tags or sport arena tags. The tag list comprises at least two tags to evaluate, but would typically include a considerably larger number than two tags.

Once the tag list is obtained, data about the tags are retrieved from the tag manager 10 in an obtain tag data step 31. Optionally, the tag data is obtained at the same time as the tag list.

In a select a candidate tag step 32, a candidate tag to evaluate from the tag list is selected. It can be as simple as looping through the list of tags of the tag list, or the selection can be more sophisticated. For example, the selection can be based on grouping, where tags of a particular subset of the tag list are processed before other tags, which allows for more efficient data usage, e.g. by caching tag data and/or event data for all tags within the subset.

In an obtain event data step 33, event data for the candidate tag is obtained from the event collector server 11. This step can optionally be performed for each candidate tag at a time, or the event data can be obtained for all tags, or a subset of the tags, of the tag list at one time.

In a conditional risk tag step 34, it is determined whether the candidate tag is to be considered a risk tag. This step is explained in more detail with reference to FIGS. 5a-b below.

If the candidate tag is considered to be a risk tag, the method proceeds to an add tag to risk list step 35. Otherwise, the method proceeds to a conditional more tags step 36.

In the add tag to risk list step 35, the candidate tag is added to the risk list. This can for example be a list of tag ids stored in the persistent storage 23 of FIG. 3. Alternatively, the risk list can be effected by setting an appropriate data field (e.g. status) in the tag manager server 10 for each of the tags in the risk list. The tag list could be a separate table linked to the tag table of the tag manager 10 using tag id.

In the conditional more tags step 36, it is evaluated whether there are more unprocessed tags on the tag list. If this is the case, the method returns to the select a candidate tag step 32. Otherwise, the method ends.

After the method has ended, operational personnel can take the list of risk tags and investigate the risk tags further. For example, operational personnel can decide to visit each of the risk tags and use a mobile terminal or other equipment to determine whether the tag is present and operational or not. Using the risk determination the workload of the operational personnel is greatly reduced by focusing on tags that are likely to have problems, and allows the tag owner to efficiently and cost-effectively monitor the tags and remedy any problems. Another example is that the operational personnel could give a service provider for a service associated with the risk tags discount for the possible inconvenience and/or profit loss that a faulty tag may have caused the service provider. Moreover, a historically collected risk can be a factor in the pricing of deployment and management of tags. For example, if it can be determined from historical risk data that a certain geographical area has a higher risk of tags being removed, the price could be higher to deploy tags there since it can be expected that more tags than average will be removed, which results in more work for operational personnel to verify functionality of tags and/or replace tags. Analogously, a geographical area with less risk than average could have a lower price for tag deployment and management.

The method of FIG. 4 can be executed by means of a computer program stored in the computer program product 60 executed in the controller 21 (FIG. 3) of the risk tag detector server 1.

Figure 5A:
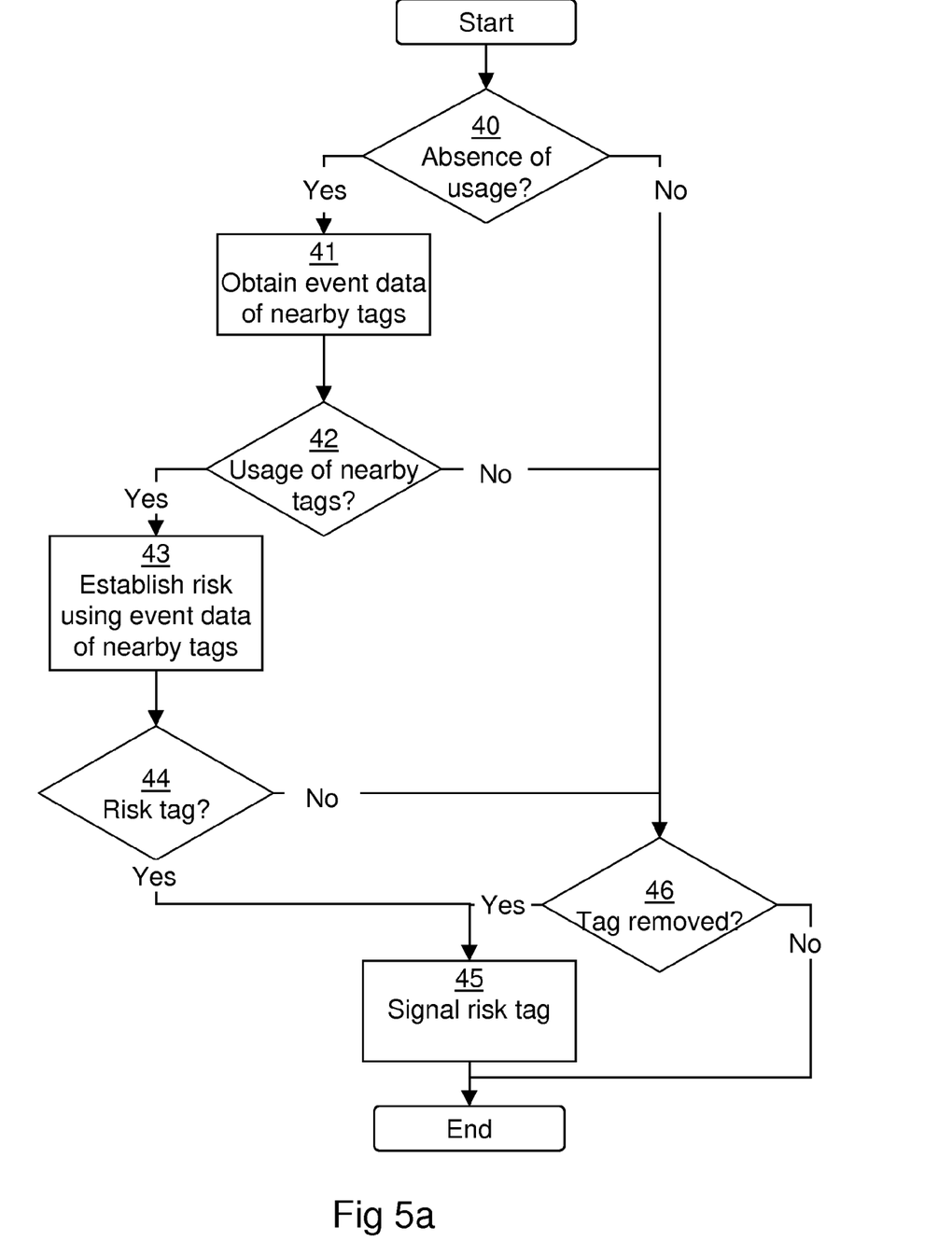

FIG. 5a is a flow chart illustrating the risk tag determination method in more detail in one embodiment. The method can be executed as part of the conditional risk tag step 34 of FIG. 4. The method is executed for one candidate tag at a time.

In a conditional absence of usage step 40, a first criterion of a first risk condition is evaluated. Using the event data for the candidate tag, it is evaluated whether the candidate tag has been read or not in a predetermined time period. The predetermined time period can be configured and tuned according to experience by an operator. If there is an absence of usage, i.e. no readings of the candidate tag in the predetermined time period, the first criterion of the first risk condition is true, and the method proceeds to an obtain event data of nearby tags step 41. Otherwise, the method proceeds to evaluate a second risk condition in a conditional tag removed step 46.

In the obtain event data of nearby tags step 41, event data, i.e. readings, for tags near the candidate tag is obtained. Nearby tags can be defined as tags of the same group (as stored by the tag manager server 10) or as tags within a particular distance of the candidate tag. The distance can be determined as a physical distance in a straight line, along a path/road, or as a typical time to transport oneself to/from the candidate tag. To evaluate the distance, location data should be stored for the tags in the tag manager server 10.

In a conditional usage of nearby tags step 42, it is evaluated whether there have been any readings in the predetermined time period of any of the nearby tags, using the event data obtained in the previous step. If there has been any usage, i.e. readings of the nearby tags, the method proceeds to an establish risk using event data of nearby tags step 43. Otherwise, the method proceeds to the conditional tag removed step 46.

In the establish risk using event data of nearby tags step 43, the event data from nearby tags is analysed to establish risk if the candidate tag is a risk tag. If, for example, all nearby tags have been read many times in the predetermined time period, the candidate tag should also have been read, if the candidate tag were to be functioning properly. Hence, since it was evaluated in step 40 that there were no tag readings of the candidate tag in the predetermined period, in this case, the candidate tag can be determined to be a risk tag. On the other hand, if there are no readings of the nearby tags in the predetermined period, the candidate tag is not determined to be a risk tag.

Optionally, the analysis can be made more sophisticated, using historical usage data of the candidate tag and the nearby tags. This could yield a probability that the candidate tag should have been detected in the predetermined time period, given a specific pattern of readings of the nearby tags. This compensates for if a particular candidate tag is in a high traffic location or low traffic location. This historic data can be retrieved from the tag manager server 10. It can be configured where the threshold probability should be for the candidate tag to be considered to be a risk tag.

Optionally, external data can be used in the analysis. Consider an example with a sports arena where each seat has an associated tag. If a candidate tag associated with a particular seat is not read on a particular event, while other nearby tags are read, it may not trigger the candidate tag to be a risk tag. If, however, for all games during a period of, say, two weeks, the tag is not read, then an external data lookup can check if tickets to the particular seat were sold in the period. If tickets were sold to a predetermined number, such as at least one or two events during the time period, then the tag could be considered to be a risk tag. Also, a time filter can be applied on the event data to compensate for the uneven usage due to readings almost exclusively being probable during events at the arena. Tags placed by seats in an arena can realistically only be expected to be read during the day of the event. This time interval (or threshold) could be customised depending on the service and on the particular tag based on previous recorded data about usage. Using a threshold would prevent the system from assuming that tags are not working just because they have not been read for a while.

In a conditional risk tag step 44, it is evaluated whether the candidate tag earlier was established to be a risk tag. If this is the case, the method proceeds to a signal risk tag step 45. Otherwise, the method proceeds to the conditional tag removed step 46.

The steps 42, 43, and 44 can collectively be considered a second criterion of the first risk condition.

In the conditional tag removed step 46, it is determined if the candidate tag can be considered to have been removed. This step can be considered a third criteria, relating to a second risk condition. For instance, the candidate tag can be considered to have been removed if the event data for the candidate tag shows that there have been repetitive readings by only one mobile terminal/user. This can indicate that someone has removed the tag, and subsequently reads the candidate tag over and over again. Optionally or additionally, the candidate tag can be considered to have been removed if the event data includes location data and the location data of the event data significantly differs form the location data of the candidate tag as stored in the tag manager server 10. Alternatively or in addition to the two above exemplary criteria of the tag removed step 46, it can be checked if the tag has been read at a time where it is unlikely to have been read, i.e. within a predetermined time interval. If, for example, a tag supposed to be positioned in a football stadium has been read at three in the night, it could be determined that the tag is considered to have been removed. If it is determined that the candidate tag has been removed, the method proceeds to the signal risk tag step 45. Otherwise, the method ends.

In the signal risk tag step 45, it is signalled to the calling method that the candidate tag is determined to be a risk tag. Optionally, a severity level is assigned to the candidate tag depending on which one or more of the criteria is/are satisfied.

It is to be noted that steps 41, 42 and 43 are optional.

Figure 5B:
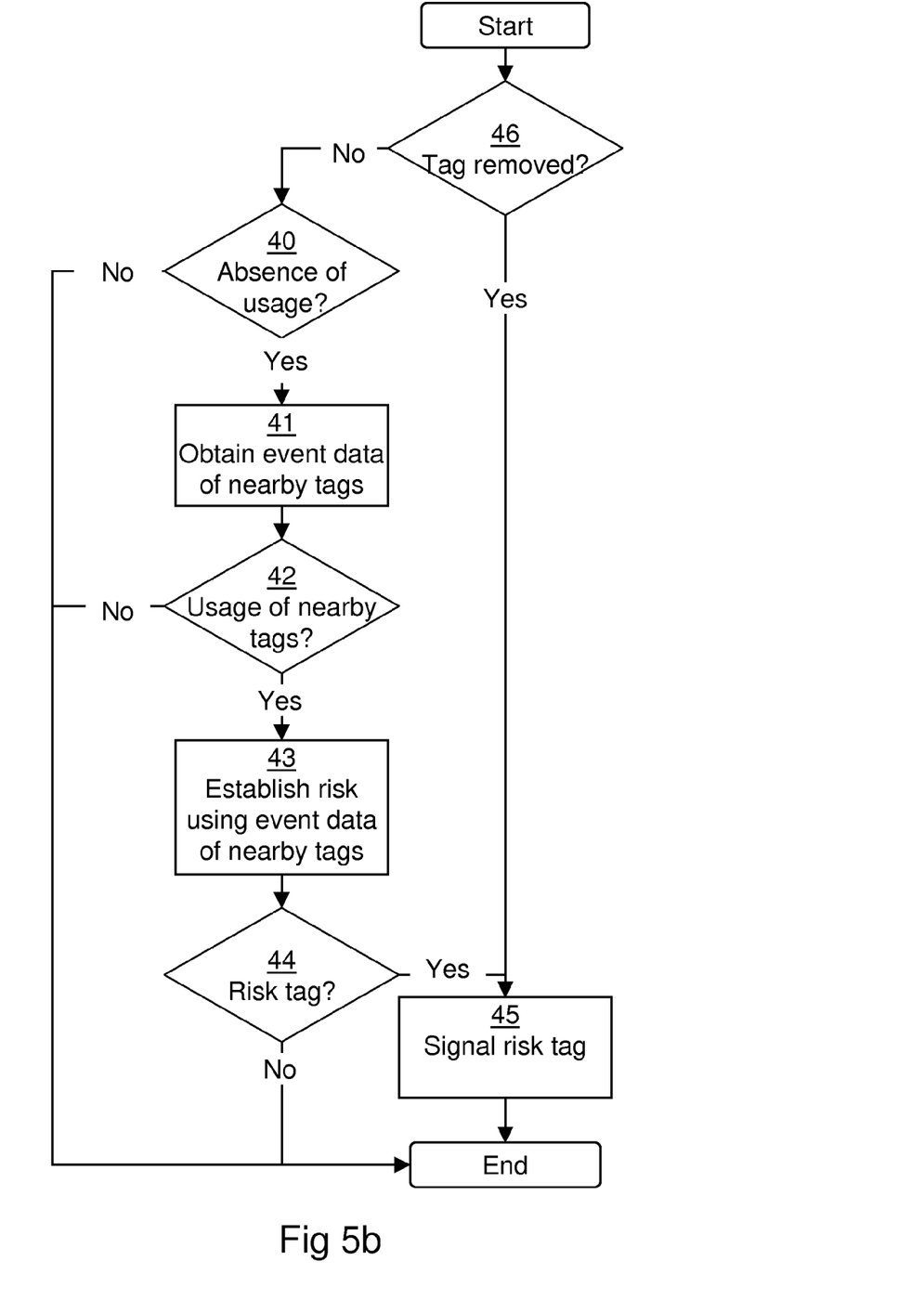

FIG. 5*b* is a flow chart illustrating an alternative embodiment of the risk tag determination method. The method can be executed as part of the conditional risk tag step 34 of FIG. 4. The method is executed for one candidate tag at a time. All steps are individually identical to the steps with the corresponding reference numerals of FIG. 5*a*. A difference is in what order the steps are performed. In particular, the step 46 for the second risk condition, i.e. tag removal is evaluated first. If it is determined that the candidate tag is likely to have been removed, the method proceeds to the first risk condition, i.e. based on absence of usage.

FIGS. 5*a* and 5*b* are equivalent in functionality and will provide the same evaluation of whether a candidate tag is to be considered a risk tag.

Figure 6:
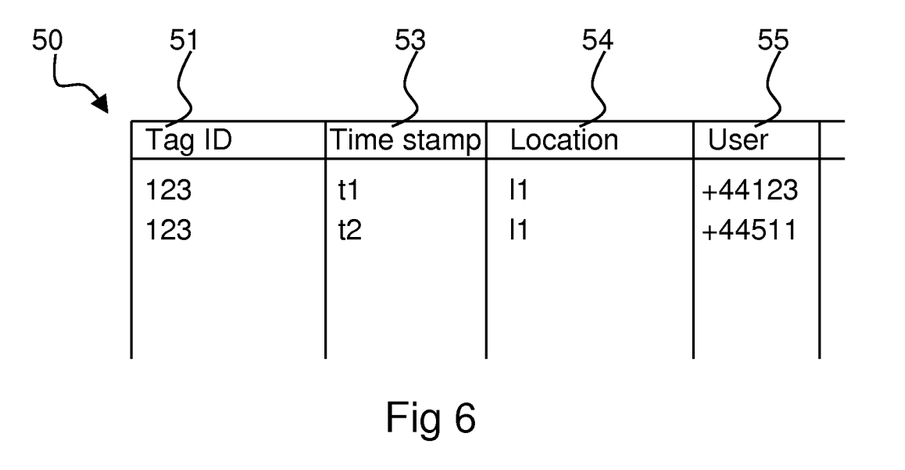
FIG. 6 is a data table illustrating event data used by the risk tag detector server of FIG. 1.

FIG. 6 is a data table illustrating event data used by the risk tag detector server of FIG. 1. A table 50 holds records where each record represents a tag reading. Each record has a tag ID 51 and a time stamp 53. The source of the time stamp 53 can either be the mobile terminal at the actual reading or the source can be the event collector server 11. Optionally location data 54 is provided when available from the mobile terminal. Also, an identity 55 of the user performing the reading can optionally be provided, e.g. as user of the mobile terminal 12 and/or identifier of the mobile terminal 12, such as MSISDN (Mobile Subscriber Integrated Services Digital Network) number, or IMSI (International Mobile Subscriber Identity).

Figure 7:
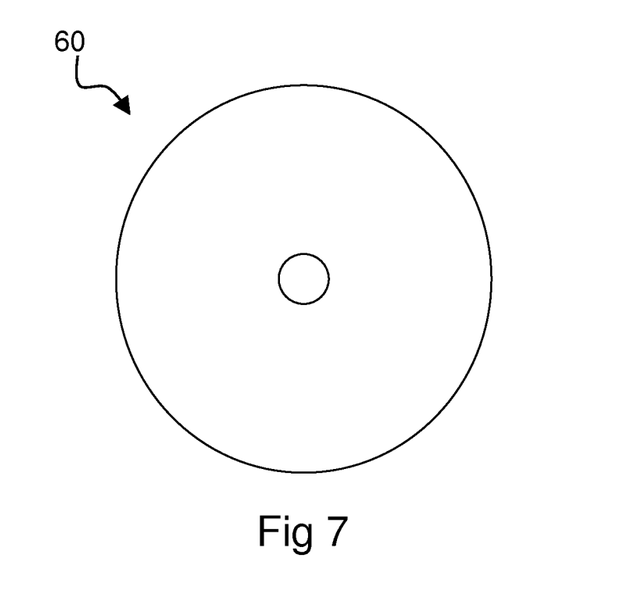
FIG. 7 shows one example of a computer program product comprising computer readable means.

FIG. 7 shows one example of a computer program product comprising computer readable means 60. On this computer readable means 60, a computer program can be stored, which computer program can cause a computer to execute the method according to embodiments described herein. In this example, the computer program product is an optical disc, such as a CD (compact disc), a DVD (digital versatile disc) or a blu-ray disc. The computer readable means can also be solid state memory, such as flash memory or a software package distributed over a network, such as the Internet. The computer readable means can hold a computer program for methods for the risk tag detector server 1.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A risk tag detector server for detecting risk tags, the risk tags being tags which are likely to be faulty, the risk tag detector server comprising:
    a tag manager interface configured to obtain a tag list comprising at least two tags to evaluate;
    a tag selector configured to select a candidate tag to evaluate from the tag list;
    a tag event interface configured to obtain event data of tag usage for the candidate tag; and
    a fault detector, wherein
    the fault detector is configured to determine whether the candidate tag is a risk tag by performing at least the following step: determining that the candidate tag is no longer affixed to an article to which the tag was previously affixed, wherein determining that the candidate tag is no longer affixed to the article comprises determining that the event data indicates that the tag has been repetitively read by a single terminal.

2. The risk tag detector server of claim 1, wherein the fault detector is configured to determine whether the candidate tag is a risk tag by further performing the step of: determining whether the event data further indicates that the tag has been read at a time outside of a second predetermined time period.

3. The risk tag detector server of claim 1, wherein the fault detector is configured to determine whether the second risk condition is satisfied, wherein determining that the second risk condition is satisfied comprises: i) determining that the event data indicates that the tag has been repetitively read by a single terminal and ii) determining that the event data indicates that the tag has been read at a time outside of a second predetermined time period.

4. A method for detecting risk tags, the risk tags being tags which are likely to be faulty, the method comprising the steps, performed in a risk tag detector server, of:
    obtaining a tag list comprising at least two tags to evaluate;
    selecting a candidate tag to evaluate from the tag list;
    obtaining event data of tag usage for the candidate tag; and
    determining the candidate tag to be a risk tag, wherein determining the candidate tag to be a risk tag comprises determining that the candidate tag is no longer affixed to an article to which the tag was previously affixed, wherein determining that the candidate tag is no longer affixed to the article comprises determining that the event data indicates that the tag has been repetitively read by a single terminal.

5. The method according to claim 4, wherein the steps of selecting, obtaining event data and determining are repeated until all tags of the tag list have been selected in the selecting step.

6. The method according to claim 4, further comprising obtaining historical usage data of each of the tags of the tag list; and
    wherein the first risk condition further comprises evaluating the historical usage data to obtain a probability that the candidate tag should have been detected in the first predetermined time period.

7. The method according to claim 4, wherein
    the method further comprises obtaining an installation location for each of the tags of the tag list; and
    the step of obtaining event data comprises obtaining a detection location,
    wherein the second risk condition further comprises a second removal criterion that the detection location substantially differs from the installation location of the candidate tag.

8. The method according to claim 4 wherein when it is determined that the candidate tag is risk tag, a severity level is assigned to the candidate tag depending on what criterion is satisfied.

9. The method of claim 4, wherein determining that the second risk condition is satisfied further comprises determining whether the event data further indicates that the tag has been read at a time outside of a second predetermined time period.

10. The method of claim 4, wherein
    determining the candidate tag to be a risk tag comprises determining that the second risk condition is satisfied, and determining that the second risk condition is satisfied comprises: i) determining that the event data indicates that the tag has been repetitively read by a single terminal and ii) determining that the event data indicates that the tag has been read at a time outside of a second predetermined time period.

11. A computer program product comprising a computer program for a risk tag detector server and a non-transitory computer readable means on which the computer program is stored, the computer program comprising computer program code which, when run on the risk tag detector server, causes the risk tag detector server to perform the steps of:

obtaining a tag list comprising at least two tags to evaluate;
selecting a candidate tag to evaluate from the tag list;
obtaining event data of tag usage for the candidate tag; and
determining the candidate tag to be a risk tag, wherein determining the candidate tag to be a risk tag comprises
determining that the candidate tag is no longer affixed to an article to which the tag was previously affixed, wherein determining that the candidate tag is no longer affixed to the article comprises determining that the event data indicates that the tag has been repetitively read by a single terminal.

* * * * *